(12) United States Patent
Hua

(10) Patent No.: US 12,062,093 B2
(45) Date of Patent: Aug. 13, 2024

(54) METHOD AND APPARATUS FOR EXECUTING QUANTITATIVE TRADING STRATEGY

(71) Applicant: FUTU NETWORK TECHNOLOGY (SHENZHEN) CO., LTD., Guangdong (CN)

(72) Inventor: Baibo Hua, Guangdong (CN)

(73) Assignee: FUTU NETWORK TECHNOLOGY (SHENZHEN) CO., LTD., Shenzhen (CN)

( * ) Notice: Subject to any disclaimer, the term of this patent is extended or adjusted under 35 U.S.C. 154(b) by 57 days.

(21) Appl. No.: 17/737,050

(22) Filed: May 5, 2022

(65) Prior Publication Data

US 2023/0153903 A1    May 18, 2023

Related U.S. Application Data

(63) Continuation of application No. PCT/CN2021/130705, filed on Nov. 15, 2021.

(51) Int. Cl.
*G06Q 40/04* (2012.01)

(52) U.S. Cl.
CPC .................. *G06Q 40/04* (2013.01)

(58) Field of Classification Search
CPC .......................................... G06Q 40/04
See application file for complete search history.

(56) References Cited

U.S. PATENT DOCUMENTS

| | | | |
|---|---|---|---|
| 8,015,097 B2 * | 9/2011 | Lawrence | G06Q 40/00 |
| 8,370,248 B2 * | 2/2013 | Baker | G06Q 40/00 |
| 8,682,773 B1 | 3/2014 | Murphy et al. | |

FOREIGN PATENT DOCUMENTS

| | | |
|---|---|---|
| CN | 106504088 A | 3/2017 |
| CN | 110322351 | * 10/2019 |
| CN | 110503557 A | 11/2019 |
| CN | 110517148 A | 11/2019 |

OTHER PUBLICATIONS

Zhai, et al., in Data analytic approach for manipulation detection in stock market, from Review of Quantitative Accounting (2018) (Year: 2018).*
International Search Report in International Application No. PCT/CN2021/130705, dated Mar. 22, 2022.

* cited by examiner

*Primary Examiner* — Olabode Akintola
*Assistant Examiner* — Brandon M Duck

(57) ABSTRACT

Provided are a method and an apparatus for executing a quantitative trading strategy, for executing the quantitative trading strategy through a graphical interface, without requiring a user to have a capability of writing program codes, thereby improving the user experience. The method for executing the quantitative trading strategy includes: displaying a graphical interface including an execution area; obtaining a first instruction inputted by a user; obtaining a first quantitative trading strategy in response to the first instruction, the first quantitative trading strategy including at least one parameter related to a real market operation; adding the first quantitative trading strategy to the execution area to form a first execution record corresponding to the first quantitative trading strategy; and executing, based on the first execution record, the first quantitative trading strategy to obtain execution information of the first quantitative trading strategy.

20 Claims, 9 Drawing Sheets

FIG. 8A

| No. | Name | Status | | Target | Account | Execution duration | Target frequency |
|---|---|---|---|---|---|---|---|
| 1 | strategy 1 | ⏸ stop | executing | target 1 | account 1 | 3:48:30 | K per day |
| 2 | strategy 2 | ▶ start | stopped | target 2 | account 2 | 2:50:25 | K per day |
| 3 | strategy 3 | ▶ start | stopped | target 3 | account 3 | 1:42:52 | K per day |
| 4 | new strategy | ▶ start | stopped | target 4 | account 4 | 0:51:13 | K per day |

Execution list    add+

FIG. 8B

Execution list    add+

| No. | Name | Status | | Target | Account | Execution duration | Target frequency |
|---|---|---|---|---|---|---|---|
| 1 | strategy 1 | ⏸ stop | executing | target 1 | account 1 | 3:48:30 | K per day |
| 2 | strategy 2 | ▶ start | stopped | target 2 | account 2 | 2:50:25 | K per day |
| 3 | strategy 3 | ▶ start | stopped | target 3 | account 3 | 1:42:52 | K per day |
| 4 | new strategy | ▶ start | stopped | target 4 | account 4 | 0:51:13 | K per day |

Popup menu:
- Stop executing
- Edit
- Delete

FIG. 9

Trading unlock

Trading account  [account 1 ▼]

Trading password  [******]

Forget password?   [Confirm]   [Cancel]

METHOD AND APPARATUS FOR EXECUTING QUANTITATIVE TRADING STRATEGY

FIELD

Embodiments of the present disclosure relate to the field of software technologies, and more particularly, relate to a method and apparatus for executing a quantitative trading strategy.

BACKGROUND

The quantitative trading strategy is increasingly widely used in financial markets. The quantitative trading strategy may directly affect the profit and loss of investment users or teams. Therefore, the quantitative trading strategy is particularly important.

When users create and execute a quantitative trading strategy, they often call Application Programming Interface (API) to implement quantitative trading by writing codes in programming languages. In this regard, it is required that the user has the capability of writing program codes, for example, manually configuring a trading environment, downloading a corresponding API interface, connecting the interface in corresponding programming software, finally, calling a trading function to implement an automated trading by learning a function of the API interface, and understanding complex concepts such as variables, functions, classes, and Transmission Control Protocol (TCP) connections in programming. Accordingly, it is required to read a huge amount of API documents, with the need of high professional restrictions. In addition, all operations are performed in form of codes, so that a user can only monitor information such as accounts and quotations based on values returned by an interface, and the user experience is poor.

Therefore, it is urgent to provide a simple way to operate a quantitative trading strategy, in order to meet the user's needs.

SUMMARY

Embodiments of the present disclosure provide a method and apparatus for executing a quantitative trading strategy, which can realize the execution of the quantitative trading strategy through a graphical interface without requiring a user to have a capability of writing program codes, thereby improving the user experience.

In a first aspect, a method for executing a quantitative trading strategy is provided. The method includes: displaying a graphical interface, the graphical interface including an execution area; obtaining a first instruction inputted by a user; obtaining a first quantitative trading strategy in response to the first instruction, where the first quantitative trading strategy comprises at least one parameter related to a real market operation; adding the first quantitative trading strategy to the execution area to form a first execution record corresponding to the first quantitative trading strategy; and executing, based on the first execution record, the first quantitative trading strategy, to obtain execution information of the first quantitative trading strategy.

In a second aspect, an apparatus for executing a quantitative trading strategy is provided. The apparatus includes: a display unit configured to display a graphical interface, the graphical interface including an execution area; an obtaining unit configured to obtain a first instruction inputted by a user; and a processing unit. The processing unit is configured to: obtain a first quantitative trading strategy in response to the first instruction, where the first quantitative trading strategy includes at least one parameter related to a real market operation; add the first quantitative trading strategy to the execution area to form a first execution record corresponding to the first quantitative trading strategy; and execute, based on the first execution record, the first quantitative trading strategy to obtain execution information of the first quantitative trading strategy.

In a third aspect, an electronic device is provided. The electronic device includes a processor, and a memory having a computer program stored thereon. The processor is configured to call and execute the computer program stored on the memory, to implement the method of the first aspect.

In a fourth aspect, a computer-readable storage medium is provided. The computer-readable storage medium has a computer program stored thereon. The computer program causes a computer to perform the method of the first aspect and any implementations of the first aspect.

In a fifth aspect, a computer program product is provided. The computer program product includes computer program codes. The computer program codes, when executed by a communication device, cause the communication device to perform the method of the first aspect and any implementations of the first aspect.

In a sixth aspect, a computer program is provided. The computer program, when being executed on a computer, causes the computer to perform the method of the first aspect and any implementations of the first aspect.

According to the embodiments of the present disclosure, the graphical interface including the execution area is displayed; in response to the instruction inputted by the user, the first quantitative trading strategy is added to the execution area to form the first execution record; and the first quantitative trading strategy is executed based on the first execution record to obtain execution information of the first quantitative trading strategy. Therefore, in the embodiments of the present disclosure, the operation of the quantitative trading strategy can be performed through the graphical interface, with which the user can intuitively interact, without requiring the user to have a capability of writing program codes, thereby improving the user experience.

BRIEF DESCRIPTION OF DRAWINGS

FIG. 8A illustrates an example of an execution list according to an embodiment of the present disclosure;

FIG. 8B illustrates another example of an execution list according to an embodiment of the present disclosure;

FIG. 9 illustrates an example of a trading password window according to an embodiment of the present disclosure;

DESCRIPTION OF EMBODIMENTS

Technical solutions in the embodiments of the present disclosure will be described below with reference to the drawings in the embodiments of the present disclosure. Obviously, the embodiments described herein are only part of, rather than all of the embodiments of the present disclosure. Based on the embodiments of the present disclosure, other embodiments obtained by those skilled in the art without paying creative efforts shall fall within scope of the present disclosure.

It should be understood that in the embodiment of the present disclosure, "B corresponding to A" means that B is associated with A. In an implementation, B may be determined based on A. It should also be understood that "determining B based on A" does not necessarily mean that B can be only determined based on A, it shall indicate that B may also be determined based on A and/or other information.

In the present disclosure, "at least one" means one or more, and "a plurality" means two or more than two, unless otherwise specified. In addition, when an association relationship of objects is described with "and/or", it indicates that the involving objects may have the three possible relationships, for example, "A and/or B" may indicate that A exits alone, A and B both exist, and B exists alone, where A and B may be singular or plural. The character "/" generally indicates that the former and latter associated objects are in a relationship of "or". "At least one of" refers to any combination of these items, including any combination of the singular or plural items. For example, "at least one of a, b, or c" may indicate a; b; c; a and b; a and c; b and c; or a and b and c, where a, b, and c may be singular or plural.

It should be further understood that the term "first", "second", etc. in the embodiments of the present disclosure are only for illustrating and differentiating the objects, and does not represent the specific limitation on the number of devices in the embodiments of the present disclosure, and it cannot constitute any limitation on the embodiments of the present disclosure.

It should also be appreciated that a particular feature, structure, or characteristic described in connection with an embodiment is included in at least one embodiment of the present disclosure. In addition, the specific features, structures, or characteristics may be combined in one or more embodiments in any suitable manner.

Moreover, the terms "including", "comprising", "having" and any variations thereof are intended to cover a non-exclusive inclusion, such that a process, method, system, article, or server that includes a list of steps or elements is not necessarily limited to those steps or elements expressly listed, but may include other steps or elements not expressly listed or inherent to the process, method, article, or device.

Figure 1:
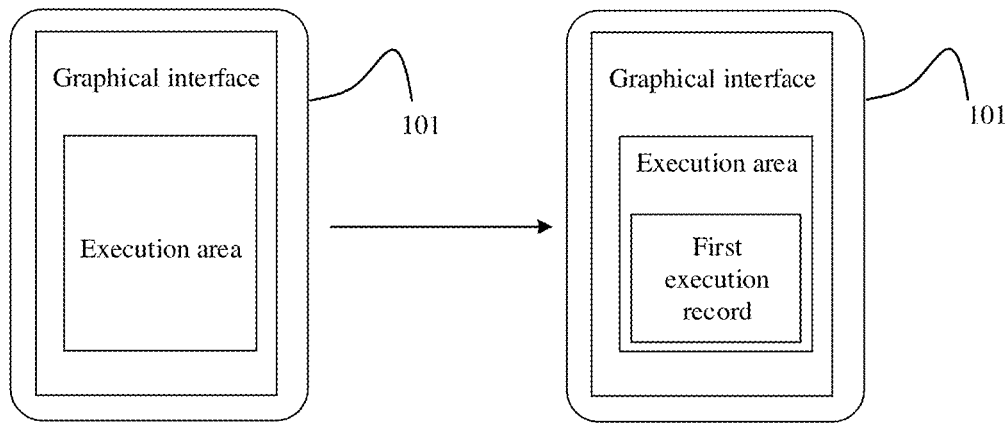
FIG. 1 is a schematic diagram of an application scenario according to an embodiment of the present disclosure.

FIG. 1 is a schematic diagram of an application scenario according to an embodiment of the present disclosure. The application scenario relates to an electronic device 101. The electronic device 101 may be various terminal devices, such as a smart Phone (e.g., an Android Phone, an iOS Phone, a Windows Phone, etc.), a tablet computer, a palm computer, a notebook computer, a mobile internet device, a wearable device, a vehicle-mounted device, and the like, which is not limited herein. The terminal device may also be referred to as a User Equipment (UE), a terminal, or a user apparatus, which is not limited herein.

Optionally, the electronic device 101 and a server (e.g., a market server) may transmit data therebetween by means of wireless communication technology. For example, the electronic device 101 illustrated in FIG. 1 may be in a client/server (C/S) mode, and a client side may pull data from a server side (e.g., a server). As a specific example, the client side may employ a Model-View-Presenter (MVP) architecture, such that interfaces, data operations, data warehouses, and the like are separated from one another.

In the embodiments of the present disclosure, for example, the electronic device may display a graphical interface including an execution area. The execution area includes an execution record corresponding to at least one quantitative trading strategy, and execution information of the quantitative trading strategy corresponding to the execution record. A user may add a first graphical quantitative trading strategy to the execution area by operating the electronic device 101, so as to form a first execution record corresponding to the first quantitative trading strategy, and then the user may operate the first quantitative trading strategy based on the first execution record to obtain the execution information of the first quantitative trading strategy.

For example, a target of the quantitative trading in the embodiment of the present disclosure may be a product such as a future, a stock, or a fund, which is not limited herein.

It should be noted that the application scenario illustrated in FIG. 1 is only intended to illustrate an embodiment of the present disclosure, but not a limitation on the present disclosure. In specific implementations, the technical solutions provided by the embodiments of the present disclosure can be flexibly applied according to actual needs.

Figure 2:
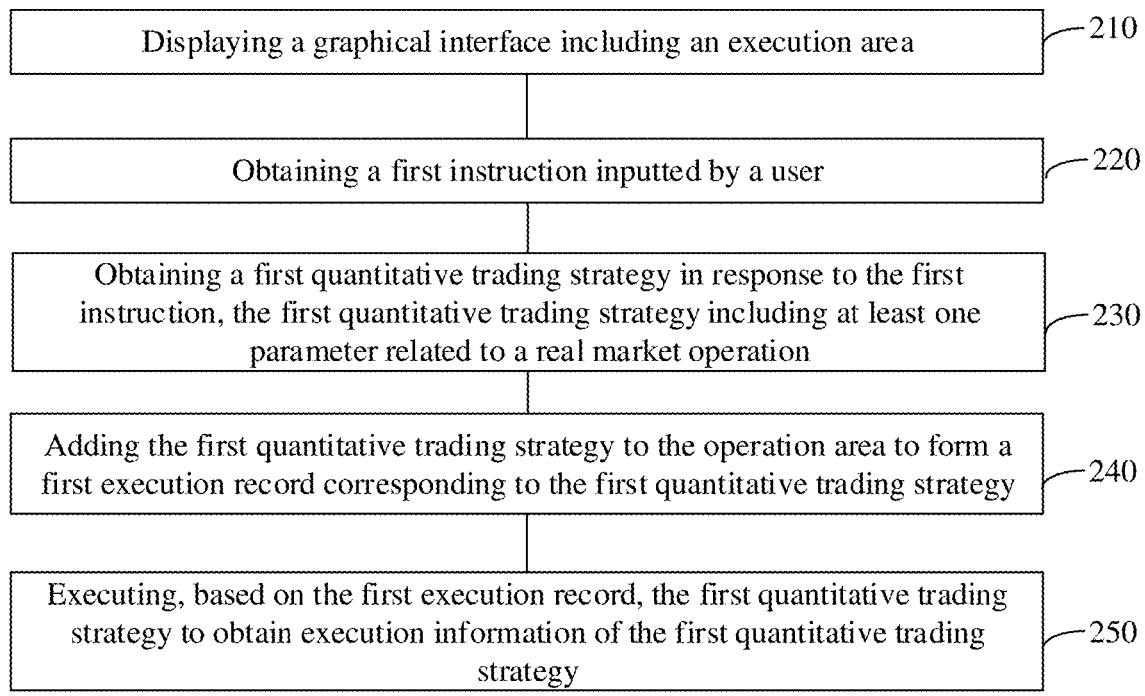
FIG. 2 is a schematic flowchart of a method for creating a quantitative trading strategy according to an embodiment of the present disclosure.

FIG. 2 is a schematic flowchart of a method 200 for executing a quantitative trading strategy according to an embodiment of the present disclosure. The method 200 may be performed by the electronic device 101 of FIG. 1, or a circuit or chip disposed in the electronic device 101. As illustrated in FIG. 2, the method 200 includes steps 210 to 240.

At step 210, a graphical interface including an execution area is displayed.

For example, the operation region includes an execution record corresponding to at least one quantitative trading strategy, and execution information of the quantitative trading strategy corresponding to the execution record.

For example, the graphical interface may be displayed on an interface of an application (APP) installed on the terminal device, for a user to create a quantitative trading strategy. The APP can be a desktop APP, or a cell-phone APP, which is not limited herein.

For example, the quantitative trading strategy may include at least one graphical control, such as a start control, a condition control, an event control or the like, which is not limited herein. The user can obtain the quantitative trading strategy by editing attribute parameters of the at least one graphical control.

The process of creating a graphical quantitative trading strategy is described in detail below in connection with the display interface of the APP. It should be understood that, the diagrams of interface in the following embodiments are only for facilitating understanding of the technical solutions provided in the embodiments of the present disclosure, but do not constitute limitations on the technical solutions of the present disclosure.

Figure 3:
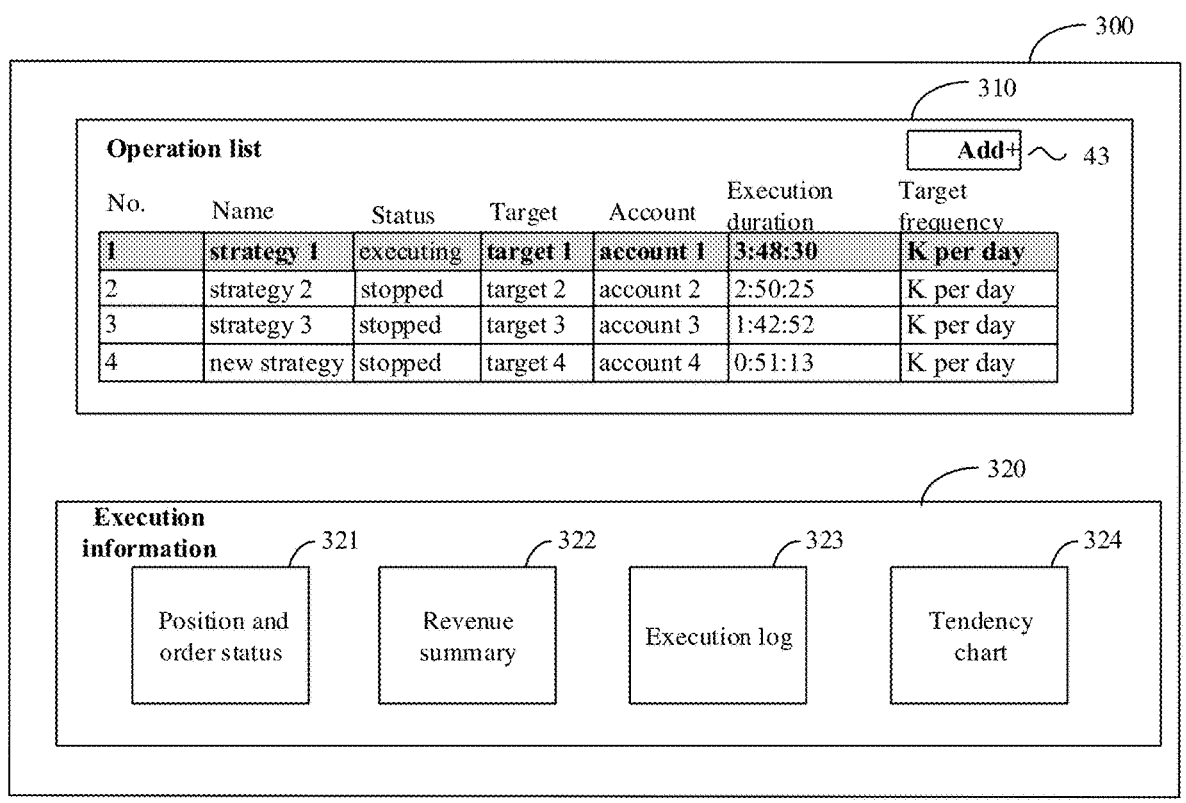
FIG. 3 illustrates a specific example of a graphical interface according to an embodiment of the present disclosure.

FIG. 3 illustrates a specific example of a graphical interface. The graphical interface includes an execution area 300, and the execution area 300 may include an execution list 310 and execution information 320. As illustrated in FIG. 3, the execution list 310 may include the execution record of at least one quantitative trading strategy, and the execution information 320 is configured to display the execution information of the quantitative trading strategy corresponding to the execution record in the execution list.

For example, as illustrated in FIG. 3, each execution record may include related information of one quantitative trading strategy, such as at least one of serial number, strategy name, status, target, account, execution duration, and target frequency, so as provide the client with the information related to the operation of the strategy. The serial numbers may represent an order in which the execution records are added into the execution list, for example, 1, 2, 3, 4, etc. The strategy name indicates a name of the quantitative trading strategy corresponding to the execution record, for example, strategy 1, strategy 2, strategy 4, and the like. The status represents the execution status of the quantitative trading strategy corresponding to the execution record, including statuses of executing and stopped. The target represents a target related to the quantitative trading strategy corresponding to the execution record, such as stocks of Tencent, Alibaba, and the like. The account represents an account of the quantitative trading strategy corresponding to the real market trading execution record, such as Hong Kong securities margin account (9856) and the like. The execution duration represents a duration of executing the quantitative trading strategy corresponding to the execution record. The target frequency indicates a frequency of a target involved in the quantitative trading strategy corresponding to the execution record, such as K per day.

For example, further reference to FIG. 3, for example, the execution area 320 may include at least four regions, which are a position and order status 321, a revenue summary 322, an execution log 323, and a tendency chart 324, respectively. The respective regions illustrate the execution conditions of the quantitative trading strategy from different aspects. For example, the position and order status 321 shows a position and order status of an account of the quantitative trading strategy corresponding to the execution record; the revenue summary 322 shows a revenue risk performance of the quantitative trading strategy corresponding to the execution record in a quantitative index manner; the execution log 323 is configured to transmit, to the user, the quantitative trading strategy corresponding to the execution record in a vernacular manner, so as to help the user monitor the execution condition of the strategy; and the tendency chart 324 shows a K-line graph of a target involved in the quantitative trading strategy corresponding to the execution record, so that the user can compare the strategy trading point and attribute the revenue risk conveniently.

Optionally, each of the execution areas may display execution information of the quantitative trading strategy corresponding to the execution record selected in the execution list. In some embodiments, the execution information in the execution area can change with the switching of execution records in the execution list.

For example, the revenue summary 322 can display the revenue indicators of the corresponding strategy in the form of a list. The list can be changed as the user switches the execution records in the execution list. The revenue indicators may include, for example, at least one of total revenue, daily revenue, total rate of revenue, daily rate of revenue, and sharp rate.

For example, the tendency chart 324 illustrates an execution target and a target appearing in the event control. When the user enters the starting operation, the K line can be dynamically generated according to the real market. A quote-K line plot area in the client may be reused. In addition, different from the quotation-K line map area in the original client, the drawing function, index management, and the like may be deleted, which is not limited herein. Optionally, two types of buying and selling points, such as an order point, a deal point and the like, can be displayed in a K-line simulation in different styles, which is not limited herein. For example, for the order point, a time point, when the user places an order, may be displayed; and for the deal point, the time point, when a deal is concluded after the user places the order, may be displayed. Optionally, in an upper column of the K line simulation, a K line period may be changed, for example, in hours, in days, day K, week K, season K, year K, 1 minute K, 3 minutes K, 5 minutes K, 15 minutes K, 30 minutes K, 1 hour K, 2 hours K, 4 hours K, Tick, and the like, which is not limited herein. The curve changes after changing K line period. The default K line period may be switched based on a frequency of the strategy. For example, when the strategy period is day K, the displayed K line period is day K. Optionally, the displaying may be performed according to the number of the targets selected by the user, a default arrangement of the displayed items may be an up-down arrangement. If there is no sufficient space for the arrangement, the arrangement may be expanded by a scroll bar. In addition, a combination of multiple figures can be formed without limitation.

For example, the position and order status 321 may be switched for different accounts. Optionally, an account corresponding to the strategy may be presented by default. In addition, a position holding list or a historical order list can be switched, it is allowed to derive data, query an order, and the like, which is not limited herein.

Figure 4:
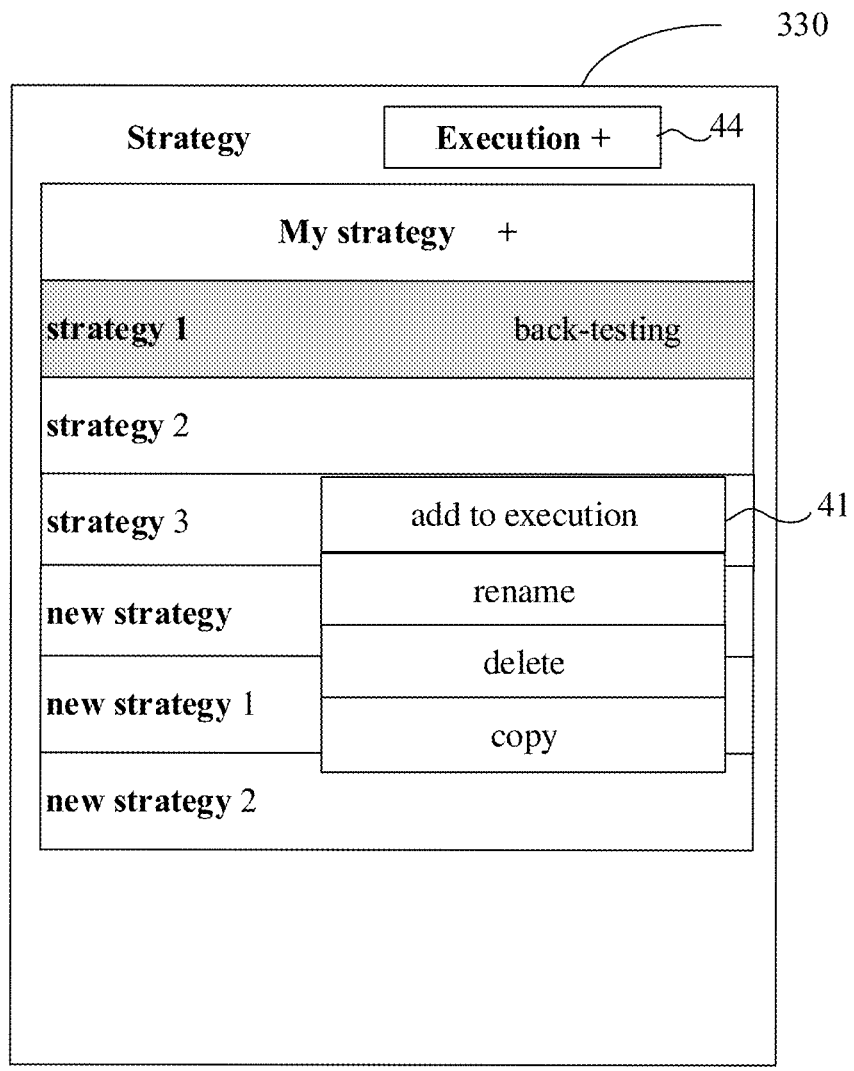
FIG. 4 illustrates a specific example of a navigation bar of a graphical interface according to an embodiment of the present disclosure.

In some alternative embodiments, referring to FIG. 4, the graphical interface may further include a navigation bar 330. As illustrated in FIG. 4, the navigation bar 330 may display at least one quantitative trading strategy, such as strategy 1, strategy 2, strategy 3, new strategy 1, new strategy 2, etc. Optionally, the navigation bar 330 may further display the status of the quantitative trading strategy, e.g., back-testing. Optionally, the navigation bar may further display an icon, e.g., "+", for creating a new quantitative trading strategy.

Figure 5:
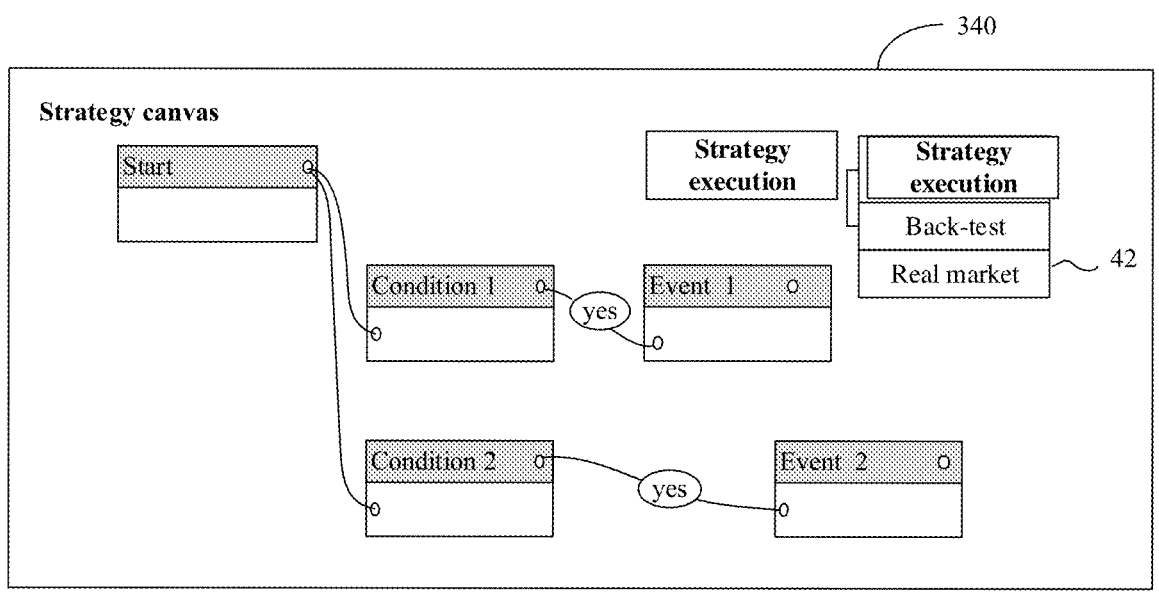
FIG. 5 illustrates a specific example of a strategy canvas of a graphical interface according to an embodiment of the present disclosure.

In some alternative embodiments, referring to FIG. 5, the graphical interface may also include a strategy canvas 340. The strategy canvas 340 may be configured to establish a quantitative trading strategy. For example, a user may add at least one graphical control to the strategy canvas to form a corresponding box, and connect the control with a connecting line to establish a quantitative trading strategy. Optionally, the graphical interface may further include an attribute box for editing attributes of the control in the strategy canvas.

At step 220, a first instruction inputted by a user is obtained. The first instruction may be configured to instruct to add a real market operation quantitative trading strategy, such as a first quantitative trading strategy.

As a first possible implementation, the first instruction may be obtained through a first entry of the first quantitative trading strategy in the navigation bar.

Referring to FIG. 4, the user may perform an operation, such as clicking, long pressing, hovering over a mouse, or right-clicking on mouse, on a button of the first quantitative trading strategy in the navigation bar 330 of strategy 3 (an example of the first quantitative trading strategy) in the navigation bar 330, a first entry may be displayed, such as an add-to-execution button 41. By operating the add-to-execution button 41, for example, by clicking, long-pressing, or right-clicking on mouse, the user can input the first instruction to add the strategy 3 to the real market operation. Accordingly, the electronic device can obtain the first instruction inputted by the user through the add-to-execution button 41, and can further determine to add the strategy 3 to the real market operation.

Optionally, subsequent to the operation of the button of strategy 3, other buttons such as rename, delete, copy, and the like may be displayed. The electronic device may obtain, by means of these buttons, the instructions for the corresponding operations of the strategy 3, which are inputted by the user, which are not specifically limited herein.

As a second possible implementation, the first instruction may be obtained through a second entry of the first quantitative trading strategy in the strategy canvas.

Referring to FIG. 5, when the first quantitative trading strategy is displayed in the strategy canvas 340, the user operates a strategy executing button in the strategy canvas 340, for example, clicking, long pressing, hovering over a mouse, or right-clicking on mouse, etc., and a second entry, such as a real market button 42, may be displayed. By operating the real market button 42, for example, clicking, long pressing, or right-clicking on mouse, the user may input the first instruction to add the first quantitative trading strategy displayed in the strategy canvas 340 to the real market operation. Accordingly, the electronic device may obtain a first instruction inputted by the user via the real market button 42, and further determine to add the first quantitative trading strategy displayed in the strategy canvas 340 to the real market operation.

Optionally, after the strategy executing button is operated, other buttons such as a back-test button and the like may be displayed. From these buttons, the electronic device may obtain user-entered instructions for the corresponding operations of the first quantitative trading strategy in the strategy canvas 340, which are limited herein.

As a third possible implementation, the first instruction may be obtained through a third entry displayed in the execution area.

With reference to FIG. 3, the user may operate a "+" button 43 in the execution list 310, for example, clicking, long-pressing, or right-clicking on mouse, and the user may input the first instruction to indicate that the quantitative trading strategy is required to be added to the real market operation.

As a fourth possible implementation, the first instruction may be obtained through a fourth entry displayed on the navigation bar 330.

Further referring to FIG. 4, the user may operate the "+" button 43 in the navigation bar 330, for example, clicking, long-pressing, or right-clicking on mouse, and the user may input the first instruction to indicate that the quantitative trading strategy is required to be added to the real market operation.

According to the embodiments of the present disclosure, different entries (such as a button tab) are arranged in the navigation bar, the execution list, and the strategy canvas, in order to obtain the first instruction inputted by the user. In this way, a frequency of switching the tab by the user can be reduced, thereby improving the operation efficiency of the user, and improving the user experience.

It should be noted that, the first instruction can be obtained in the manners as described in the above four implementations, but the embodiments of the present disclosure are not limited thereto. For example, the user may also input the first instruction through another entry in the graphical interface, or input the first instruction through another module or unit of the electronic device, such as a voice input unit, which are not limited in the present disclosure.

At step 230, a first quantitative trading strategy is obtained in response to the first instruction, the first quantitative trading strategy including at least one parameter related to a real market operation.

In some alternative embodiments, in response to the first instruction, a parameter setting interface for the first quantitative trading strategy may be displayed, and then a parameter related to real market operation inputted by the user may be obtained through the parameter setting interface. For example, the parameter setting interface may be a pop-up, for example, in response to the first instruction, the parameter setting interface pop-up may popup for the user to input parameters related to the real market operation.

Therefore, in the embodiments of the present disclosure, through the parameter setting interface, the user can set corresponding parameters in a personalized manner in combination with the own demands, thereby improving the user experience.

For example, the parameters related to the real market operation include at least one of a strategy name, a trading account, or a frequency parameter, the frequency parameter includes an execution target and/or an execution frequency. The strategy name is a name of the quantitative trading strategy to be added by the user to the real market operation. Optionally, the user may add the corresponding strategy according to his or her need. The trading account is an account on which the strategy runs. Optionally, the user may select an appropriate account based on the status of account fund, dealer information, and the like. The frequency parameter may include an execution parameter set (also referred to as a target group), including, for example, an execution target and a frequency, the execution target indicating that when the execution target has data to push at the set frequency, the strategy is triggered to operate.

Figure 6:
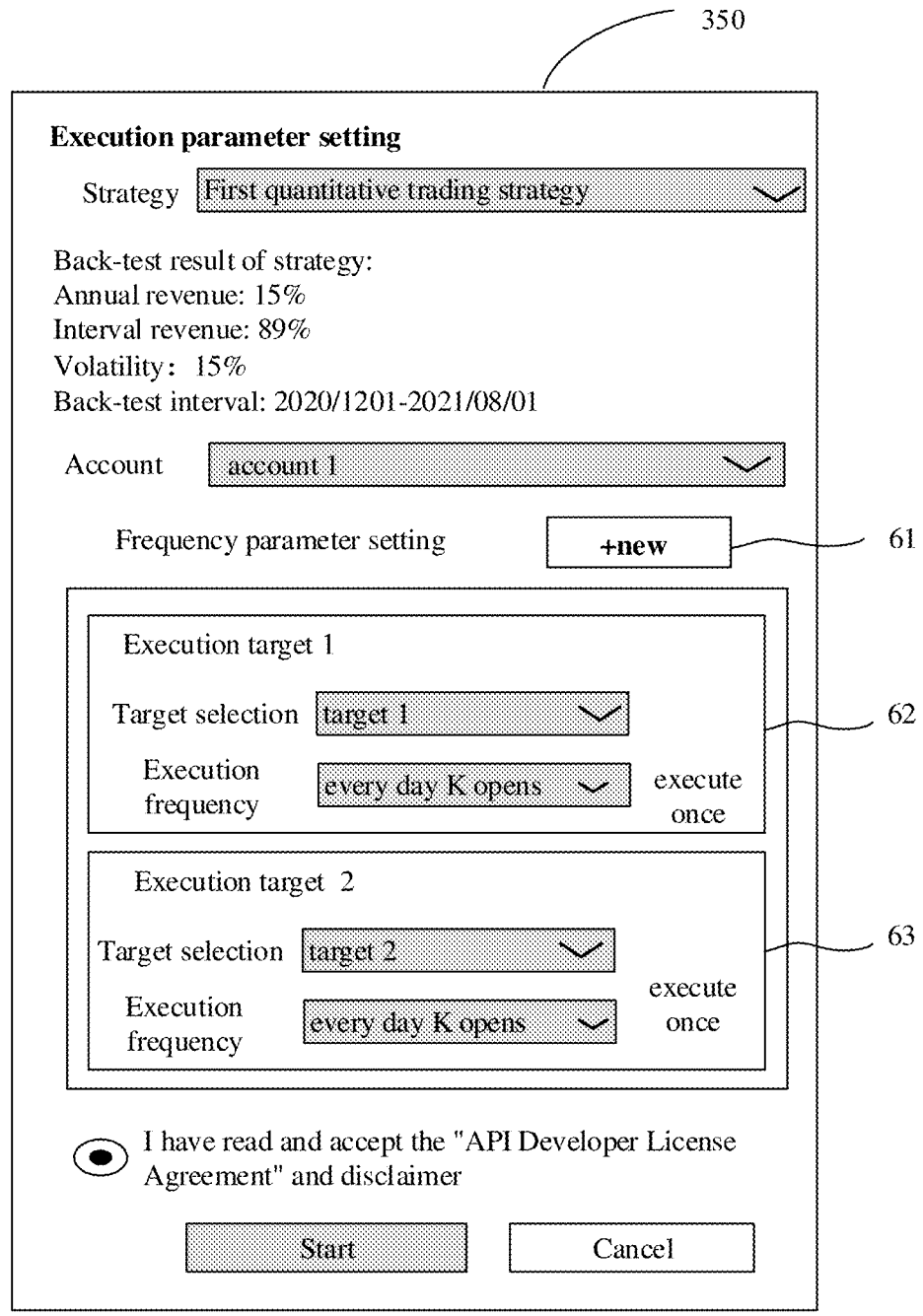
FIG. 6 illustrates an example of a parameter setting interface according to an embodiment of the present disclosure.

In some alternative embodiments, FIG. 6 illustrates an example of a parameter setting interface 350. As illustrated in FIG. 6, the strategy may be selected via a drop-down option, such as an enumerated drop-down menu, where the enumerated option may be the quantitative trading strategy in the navigation bar.

Optionally, the strategy name may be presented as different default values according to different modes of entering the execution parameter setting. As an example, for the first possible implementation of obtaining the first instruction, the default value of the strategy name may be strategy 3; as another example, for the second possible implementation of obtaining the first instruction, the default value of the strategy name may be the selected first quantitative trading strategy in the strategy canvas; as yet another example, for the third or fourth possible implementation of obtaining the first instruction, the default value of the strategy name may be null.

Further referring to FIG. 6, after the strategy has been selected, the user is required to select an account for the real market trading. For example, the account may be selected via a drop-down option, such as an enumerated drop-down menu, where the enumerated options may be, without limitation, all or some of the accounts owned by the user. The default value of the account can be determined in the following 3 situations.

Situation 1: there is one corresponding account.

Figure 7A:
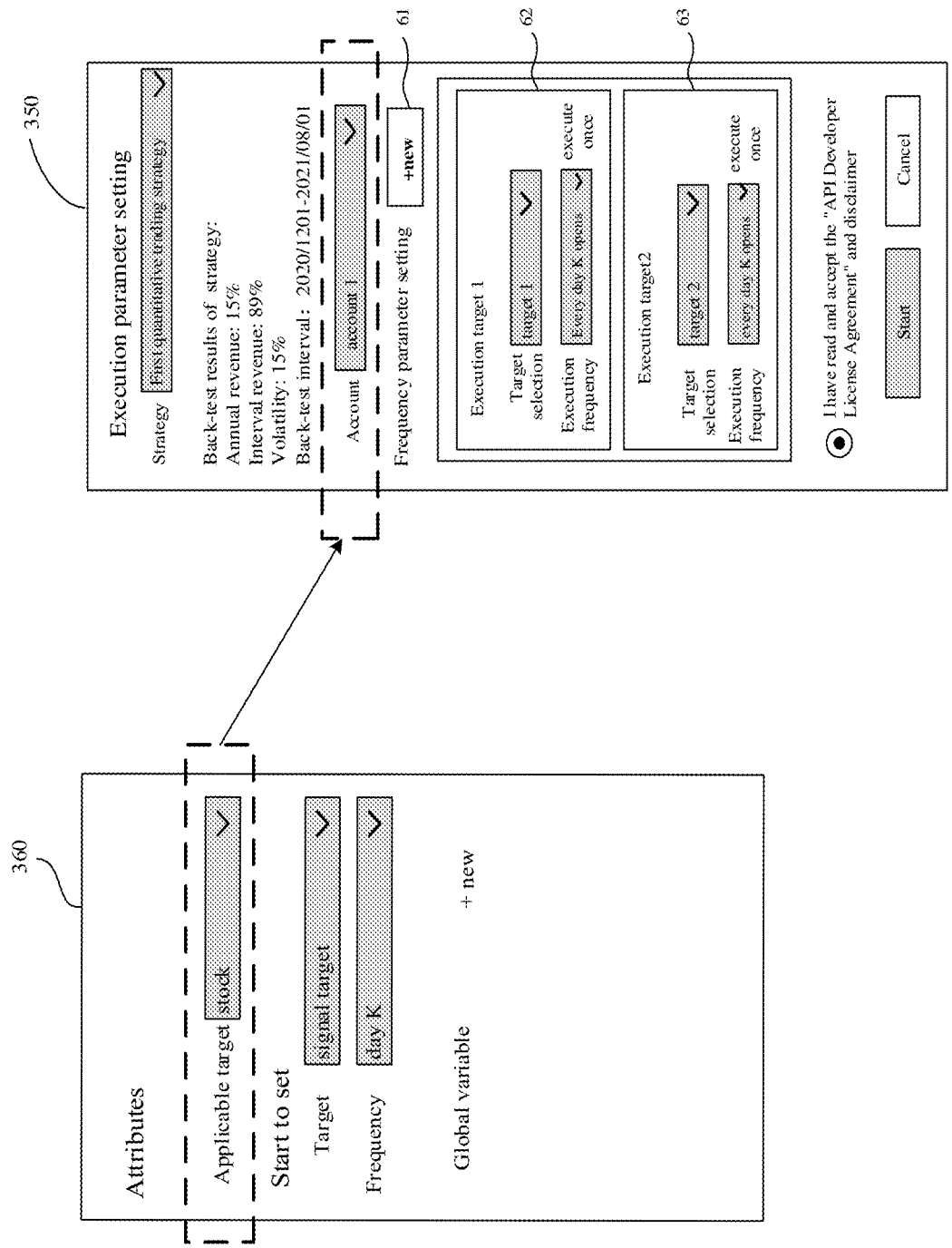
FIG. 7A illustrates another example of a parameter setting interface according to an embodiment of the present disclosure.

For example, the corresponding account logic may be to detect a target corresponding market in a first trading event (e.g., place an order, withdraw an order) in the canvas, and adopt an account using the market as the corresponding account. At this point, the default value for the account illustrates the account consistent with the strategy selection. For example, referring to FIG. 7A, when a stock is to be selected based on a target of the applicable strategy in a start box 360, a stock account, e.g., Account 1, is selected as the account default value.

Situation 2, there are two and more corresponding accounts.

In this case, the account default value is null.

Situation 3, the user has not opened a relevant account.

In this case, the account default value is null, but other accounts can be seen when pulled down.

In an embodiment of the present disclosure, the number of the execution parameter sets may be one, two, or more, each execution parameter set corresponds to the same strategy, the number of targets in each execution parameter set may be one, two, or more, and the execution parameter set includes the target and the frequency parameter corresponding to the target. Each target may correspond to a frequency parameter, and the frequency parameters corresponding to the targets can be the same or different.

Further referring to FIG. 6, after the user selects an account, the frequency-related parameter may be filled in. For example, a user can create a new execution parameter set, including at least one target and corresponding execution frequency of each target, via a new button 61 in the parameter setting interface 350, so as to substitute a quantitative trading strategy for executing and trading processing, for example, an execution parameter set 62 and an execution parameter set 63. Optionally, multiple parameter sets may be substituted and packaged as parameters of one execution record. For example, the execution parameter set 62 and the execution parameter set 63 are packaged as parameters of one execution record, that is, substituting multiple parameter sets (for example, the parameter set 62 and the parameter set 63) into the same strategy and packaging them as a same investment portfolio. Therefore, on the one hand, by setting a plurality of execution parameter sets, the embodiments of the present disclosure can help to monitor a plurality of sets of targets by using one set of codes, and on the other hand, they can help to reduce the number of times of repeatedly adding execution area.

As an example, the number of the execution parameter sets may be limited, for example, one quantitative trading strategy may correspond to at most 5 execution parameter sets, which is not limited in the present disclosure. In some embodiments, when the number of execution parameter sets reaches an upper limit, a new button 61 may be set to be disable, and a sentence of "the number of execution parameter sets has reached the upper limit" or the like may be hovered, which is not limited in the present disclosure.

Figure 7B:
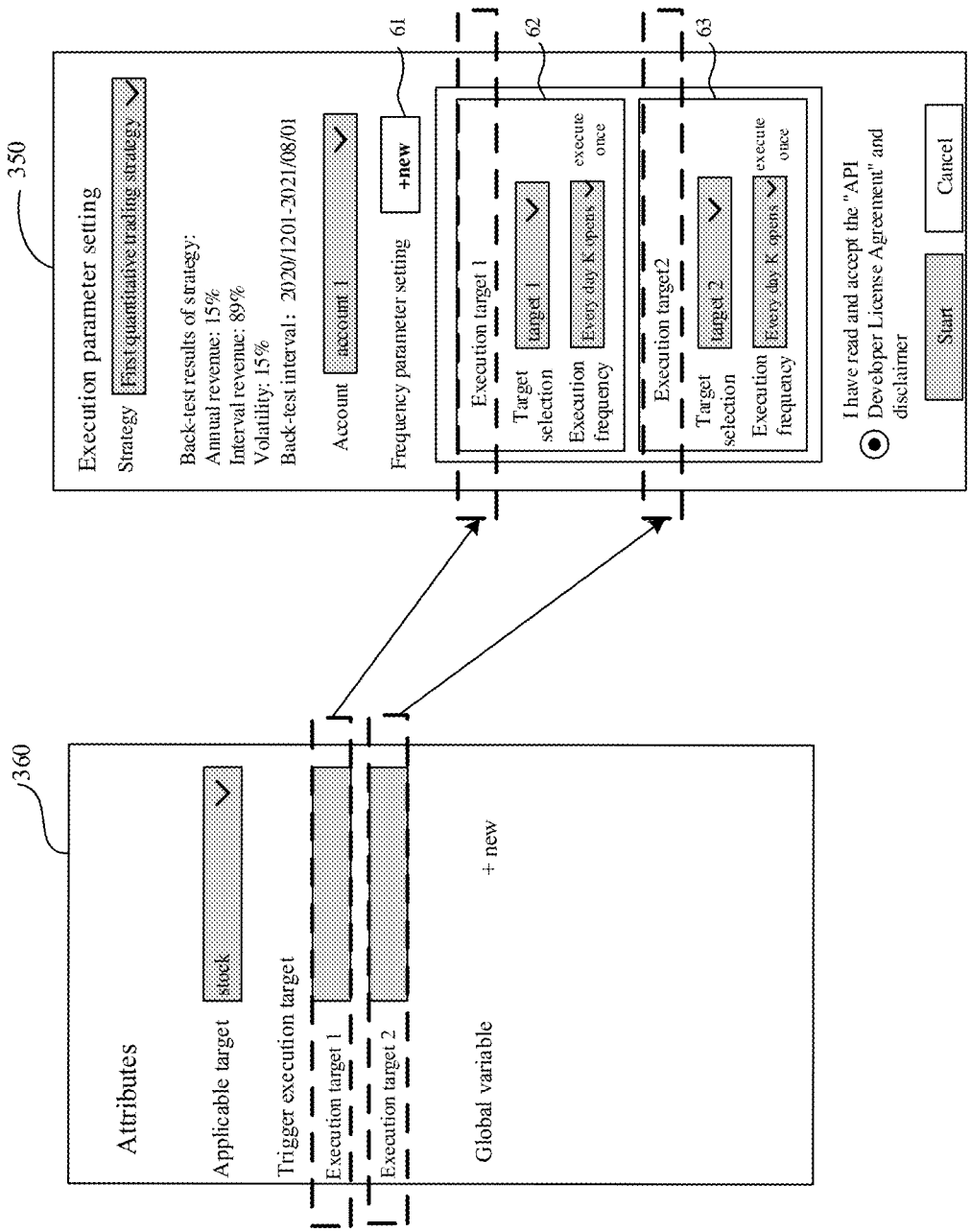
FIG. 7B illustrates yet another example of a parameter setting interface according to an embodiment of the present disclosure.

With reference to FIG. 6, in the embodiment, names of the execution parameter sets may be further set to improve a recognition of each execution parameter set. The name of the execution parameter set may be written by a serial number, may be set by the user, or may be determined by the name of the execution target. For example, when there is only one execution target in the execution parameter set 62 and the execution parameter set 63, the execution parameter set 62 may be named as execution target 1, and the execution parameter set 63 may be named as execution target 2. Referring to FIG. 7B, the name of the execution target may be triggered to display and start, names of the parameters that trigger the execution target in the box 360 are the same, such as the execution target 1, and the execution target 2, etc., which is not limited in the present disclosure. Optionally, in the setting of the execution parameters, the name of the execution target is not allowed to be modified. The name can be only modified in a start box when necessary.

Optionally, the parameter set may include a target name and an execution frequency. As illustrated in FIG. 6, the name of the target may be determined by means of search enumeration. Optionally, the default value may be displayed as null, or modified based on the user's requirement, for example, by setting the execution target 1 to "Tencent" or "PING AN INSURANCE" through a drop-down option, etc. The target indicates a target triggering the execution, i.e., when the execution target has data push at the set frequency, the whole strategy is triggered to be executed once. Optionally, the number of the targets is the same as a number that is set in the start box 360 and is not allowed to be modified.

Further referring to FIG. 6, the frequency may set a drop-down option, such as an enumerated drop-down menu selection frequency. For example, the frequency may be day K, 1 minute K, 3 minutes K, 5 minutes K, 15 minutes K, 30 minutes K, 60 minutes K, Tick, only operated once, and the like, which is not limited herein. Optionally, the default value may be 1 minute K. The frequency setting is a frequency setting of the execution target, and the data of the execution target at the frequency is subscribed, or subscribed for multiple times when there are multiple execution targets.

Optionally, the parameter selectable data in the parameter setting interface may be obtained based on the current user. For example, when the parameter setting interface (e.g., pop-up window) is initialized, strategy list data of the user may be obtained. The strategy list data may include basic information of the strategy (such as target group, start time of executing, continuous executing period, remaining unlocking time, and the like), basic information of the execution parameter set corresponding to the strategy (such as signal target, frequency, and the like), and account list data of the user may be obtained. The account list data includes account basic information and the like, which is not limited herein. In other embodiments, the data may be obtained at a postponed time point when the data is needed, which is not limited in the present disclosure.

Optionally, the strategy option may be changed through the strategy selection control, so as to trigger the change of the basic information of the parameter set that is currently executed, and simultaneously, to clear the whole display area of the execution parameter set. When the execution parameter set is added, an overall control including the content of the execution parameter set may be generated based on the current execution parameter set base information. When the user deletes the execution parameter set, the overall control corresponding to the execution parameter set can be deleted. In some embodiments, after changing the strategy options, the data of the execution parameter set of the previous strategy may be retained, so that the data of the execution parameter set can be redisplayed when switching back to the originally selected strategy.

Specifically, in the present embodiment, the execution parameters may be detected before executing, and based on the parameter values filled by the user and the parameter ranges set in advance based on the parameters, it can be determined whether the parameters are appropriate or not. Based on an abnormal condition of the parameter value, a corresponding alarm may be displayed. The method includes the following specific steps.

$$lev = \begin{cases} \text{par\_value} \in [\text{par\_min}, \text{par\_max}]; 1 \\ \alpha \cdot \dfrac{\text{par\_min} - \text{par\_value}}{\text{par\_min}} > \eta; 2 \\ \beta \cdot \dfrac{\text{par\_max} - \text{par\_value}}{\text{par\_max}} > \mu; 3 \end{cases}$$

In the present embodiment, lev represents an alarm level, and when it is equal to 1, it indicates a normal level, when it is equal to 2, it indicates a general alarm, and when it is equal to 3, it indicates a serious alarm, where the specific presentation of each alarm level is different; par_value represents parameter values actually filled by the user; par_min represents the minimum value in the preset parameter range; par_max represents the maximum value in the preset parameter range; α and β represent preset abnormal calculation factors; η and μ represent preset abnormal threshold values and η<μ. By means of the parameter detection and alarm display, problems occurring in the trading strategy can be detected efficiently and intelligently, thereby improving the operation efficiency of quantitative trading.

In some alternative embodiments, a record description of the first quantitative trading strategy may be displayed via the parameter setting interface. When the first quantitative trading strategy is back-tested, the record description describes a back-test result of the first quantitative trading strategy. When the first quantitative trading strategy is not back-tested, the record description describes that the first quantitative trading strategy is not back-tested, and/or a back-test of the first quantitative trading strategy is recommended. When the first quantitative trading strategy is back-tested and then updated, the record description describes the back-test result before the first quantitative trading strategy is updated, and recommends a back-test of the updated first quantitative trading strategy.

Further referring to FIG. 6, for example, after selecting a strategy on the parameter setting interface, if the selected strategy is not detected, a sentence may appear to remind the user to detect the selected strategy, and a confirmation button may be disable. When the selected strategy has been detected, a record description of the selected strategy may be displayed on the interface. The record description may present information about the selected strategy, such as whether a back-test has been performed, how much revenue, etc. Specifically, it can be divided into three situations.

Situation 1: the strategy has not been back-tested.

Specifically, if the user does not perform the back-test on the strategy added to the real market, an operation risk may exist, and the user may be reminded to perform the back-test in this case. For example, a sentence of "the strategy has not been historically back-tested, suggesting a back-test to check the performance of the strategy" may be displayed.

Situation 2: the current version is back-tested (i.e., the latest version).

Specifically, the user has back-tested the latest version of the strategy, the back-test result can be displayed. For example, the back-test result may include at least one of annual revenue, interval revenue, volatility, and back-test interval, and the like.

Further, after the quantitative trading strategy is back-tested, the present embodiment may adjust the quantitative trading strategy based on the result of the back-test.

Situation 3: a non-current version is back-tested.

Specifically, if the user has back-tested the strategy, but subsequently has modified the strategy, and the modified strategy has not been back-tested, the previous back-test result may be displayed, and the user is prompted to perform the back-test on the current version of the modified strategy.

Optionally, the back-test information of the strategy may be included in the strategy list data obtained when the parameter setting interface (for example, pop-up window) is initialized, and the strategy option may be changed through the strategy selection control to trigger a back-test display content change. For example, for a strategy that has not been back-tested, a back-test reminding area can be displayed, a back-test data area is hidden, and the content of the back-test reminding area is changed to remind a user of the back-test; for the back-tested strategy of the current version, the back-test reminding area can be hidden, the back-test data area is displayed, the content of the back-test reminding area is changed into content of a strategy type, and the back-test data is changed into the back-test data of the selected strategy; for the back-tested strategy of the non-current version, the back-test reminding area can be displayed, the back-test data area is displayed, and the content of the back-test reminding area is changed to recommending the user to back-test the strategy.

In some alternative embodiments, in the parameter setting interface, a risk reminder may also be given to the user, for example, the user is reminded to check out legal terms so as to disclose the trading risk, so that the user knows the risk point of the real market operation. Further referring to FIG. 6, below the parameter box, the user may be asked to check and agree that "I have read and accept the API Developer License Agreement and disclaimer" before proceeding to the next step. Optionally, if the user has checked one time, the system may automatically check next time to improve the user experience. Optionally, the case may be set as a hyperlink, and the user may exit the detailed legal provision content or disclaimer after clicking. Optionally, when the legal provision is not checked, the confirmation button in the parameter setting interface may be disabled to disable the confirmation button control.

In some alternative embodiments, after the user completes the execution parameter setting, a parameter related to the real market operation of the strategy may be further detected, or a market-information privilege of a trading account of the user may be detected.

For example, the detection of the parameter related to the real market operation of the strategy may include detection for the strategy, the account, and the target group, so as to help the user to identify the error in advance. Optionally, the user may be remined of modifying the strategy, so as to avoid errors when the strategy enters the real market operation, and reduce or avoid unnecessary loss of user property. When the strategy detection fails, a quantization component may prompt the user to modify the strategy, otherwise the strategy cannot be added to the execution list, which means that the strategy cannot be added to the real market operation.

As a possible implementation, detection may be performed between a strategy and an account. For example, the strategy type is required to be consistent with the account type, for example, a securities strategy can only be executed under a securities account, and cannot be executed under a futures account, and similarly, a goods strategy can only be operated under a goods account. Otherwise, a prompt reporting errors may appear, and confirm button is set to be disable at the same time.

As a specific example, a type of the first quantitative trading strategy is set to be securities in the start box by the user, and the user selects a futures account in the execution parameter setting interface, which results in inconsistency between the strategy type and the account type. In this case, an error may be reported and the user is prompted with a reminder, for example, "the account contradicts the strategy type, please select a futures account, or modify the strategy type in the start box".

As another possible implementation, the account and the target may be detected. For example, the account is required to be consistent with the target. For example, a futures account can intelligently trade a target of futures, rather than trading stocks, options, etc.; the securities account can only trade stocks, options and the like, rather than trading futures. As another example, if the user uses the execution target in a trading event (e.g., order placement, order withdrawal) in the strategy canvas, it is required to be detected whether the type of the execution target is consistent with the type of the account. Otherwise, the text prompting errors may appear, and the confirm button is set to be disable at the same time.

As a specific example, if the user selects a futures account in the execution parameter setting interface, and the selection of the target is Tencent Holdings, an inconsistency may be reported and the user may be reminded, for example, a case may be made that "the account type contradicts the target variety, and please select the target using the futures account".

For example, after the parameter setting is completed, the market rights detection may be performed on the user account to ensure that the current market rights of the user are sufficient to cover the market rights required by the strategy in the process of executing the real market. As a specific example, assuming that the existing privilege of the user is the Hong Kong stocks BMP market-information privilege, and the strategy employees 10-file quotation (LV2 privilege), the user can be prompted to purchase the market-information privilege or modify the strategy.

In some alternative embodiments, the parameter may be detected in two interactive processes. These two interactive processes are described below.

In one interactive process, it may be detected whether the parameter content is valid after the corresponding parameter setting is completed. For example, the detection may include at least one of the followings.

1. When the account selection frame changes the account selection item, it is detected whether the type of the basic data of the selected account matches with the type of the basic data of the selected strategy, in response to that the strategy has been selected.

2. When the target selection control changes the target option, it is detected whether the required privilege is included in the data of the selected target and the base data of the target group corresponding to the selected strategy, and it is detected whether the type of the data of the selected target matches with the type of the basic data of the selected strategy, in response to that the strategy has been selected.

In the other interactive process, when the parameter setting is confirmed, it can be detected whether the parameter content is complete. The detection may include at least one of the followings.

1. A selected effective strategy is detected.
2. A selected effective account is detected, and the account type matches with the strategy type.
3. The selected effective data of each target in the target group is detected, the target has the corresponding privilege, and the type of the target matches with the type of the strategy.
4. It is detected that the legal provision is checked.

At step 240, the first quantitative trading strategy is added to the execution area to form a first execution record corresponding to the first quantitative trading strategy.

For example, after the detection of the parameter related to the real market operation of the first quantitative trading strategy is completed, the first quantitative trading strategy may be added to the execution list, and an execution record corresponding to the first quantitative trading strategy, i.e., the first execution record, may be formed. For example, by clicking a confirm button of the execution parameter setting interface, the detected strategy is added to the execution list, and the execution record is added to the execution list.

At step 250, the first quantitative trading strategy runs based on the first execution record to obtain execution information of the first quantitative trading strategy.

For example, a second instruction inputted by the user can be obtained through an entry provided by the first execution record; and in response to the second instruction, the execution status of the first quantitative trading strategy is controlled. For example, the first quantitative trading strategy is started to operate, and the execution information of the first quantitative trading strategy is obtained.

Optionally, the execution of the first quantitative trading strategy may be stopped based on the first execution record. For example, a third instruction inputted by the user may be obtained through the entry provided by the first execution record, and the execution of the first quantitative trading strategy may be stopped in response to the third instruction.

That is, the execution statuses of the first quantitative trading strategy include executing or stopped. Optionally, multiple strategies are allowed to execute simultaneously.

As a possible implementation, referring to FIG. 8A, the execution record in the execution list 310 may further include an operation column 64, which may include a "start" or "stop" button, and the user may switch the execution status of the corresponding strategy by clicking the "start" or "stop" button.

As another possible implementation, referring to FIG. 8B, through an operation (e.g., clicking, right-clicking, or hovering the mouse, etc.) on the execution record of the strategy, an operation box 65 may be displayed, in which a button for switching the status of the strategy may be displayed. For example, in FIG. 8B, for the execution strategy 1, the stop button may popup by right-clicking on mouse, and at this time, the execution of strategy 1 can be stopped by clicking this button. In addition, for a stopped strategy, a start button for initiating the execution may popup by operation, and at this time, the execution of the strategy can be started by clicking this button. Optionally, when a button for switching the status of the strategy is displayed, other buttons may also be displayed, such as edit button, delete button, or other buttons, which is not limited herein.

In some alternative embodiments, in process of executing a strategy, if an error occurs, the status of the strategy may be automatically switched to be stopped. Optionally, the user may be reminded through a pop-up window, or an execution log.

In some alternative embodiments, the contents of the execution list may be managed by a frame. For example, when the "start" or "stop" button is clicked, the contents in the execution list may be saved into the data interface, and when the "delete" or "stop" button is clicked, the contents may be saved into the data interface. Similarly, when the data interface is modified, the content in the execution list can be updated in real time through event notification.

In some alternative embodiments, a trading password interface is displayed, for example, the trading password window illustrated in FIG. 9, when the first quantitative trading strategy is added to the execution area for the first time, or when a validity period of the first quantitative trading strategy in the execution area expires, or when the first quantitative trading strategy is re-executed after the execution of the first quantitative trading strategy is stopped, and then the trading password inputted by the user is obtained through the trading password interface. That is, in these three cases, the user must unlock the trading, which can protect the fund security of the user and reduce the risk that the terminal device (such as a computer, a smart phone, etc.) is traded by others if the screen is unlocked.

For example, when the first quantitative trading strategy is added to the execution list for the first time, it may be detected whether the user performs unlocking after the user completes the execution parameter setting interface. If no unlocking is detected, the trading password window illustrated in FIG. 9 may pop up. The user can only successfully unlock the trading by inputting the correct trading password. After the trading is successfully unlocked, the quantitative trading strategy can be added into the execution list, otherwise, the quantitative trading strategy cannot be added. Optionally, after the unlocking is successful, the window may be closed, and the execution parameter setting interface is returned.

Optionally, many execution records in the quantization component can be separately unlocked according to dealer and unlock in terms of the user performance, and the execution records of different dealers can be unlocked promptly without mutual interference. In addition, the execution records of the same dealer may share an unlocking duration, for example, the latest one may be the priority.

In some embodiments, the unlocked status of the quantization component and the unlocked status of the manual ordering on the APP may not share. For example, if the user performs unlocking at other modules, the unlocked status of a single execution record of the quantified component is not affected.

In some embodiments, in the execution list, the unlocking duration may be set for each execution record, as the validity period corresponding to the execution record. For example, in a status that the strategy is continuously executed, the validity period may be 14 days; the validity period may be 15 minutes when the strategy is stopped. Optionally, the client may automatically initiate a renewal request to extend the unlocking duration before the ticket expires. Alternatively, if the user re-enters the password during the validity period (e.g., initiates another strategy, or re-initiates a suspended strategy on the execution record, etc.), the validity period may be re-timed. If the continuous ticket reaches the upper limit, the script of the user can be stopped according to the error code returned by the server, for example, the execution record status is changed into a stop state, and meanwhile, the user can be reminded with the context in the execution log. If the unlocking duration is shorter than 1 day in the executing state, the user can be reminded of incoming due.

For example, for a case that the strategy is continuously executed, the user can click on "unlock" to manually update the validity period, and a window for inputting the trading password may pop up. If the correct password is inputted, the validity period of the execution record of the same dealer in executing can be updated to 14 days. When the strategy is in a stopped status, the unlock button can be disable, and in this case, the validity period cannot be manually updated by the user.

For example, for a case that the first quantitative trading strategy is re-executed after being stopped, a parameter setting window may be operated when the user restarts the execution record in the stopped status and the unlocking validity period has passed, and a trading password window may popup for the user to unlock again after the user completes the filling and clicks the confirmation.

In some alternative embodiments, the validity period and the renewal behavior of the unlock may be managed by a same platform. When the renewal period is coming, the user may be reminded (e.g., by means of an execution log or a pop-up window) to proceed with the renewal. In addition, after the validity period expires or the renewal fails, the user can be reminded to unlock again in an execution log or a pop-up window.

Optionally, the execution record may further include remaining unlocking time, an unlock status update button, and the like, which is not limited herein. For example, the remaining unlocking time in the execution list may be obtained through the data interface. By way of example, the password unlocking remaining time is obtained when the strategy is first created, or when the validity period is updated subsequently through unlocking. After the remaining time is obtained, the remaining time may be calculated by a timer. Optionally, the remaining unlocking time in the execution list may be updated every minute.

Therefore, in the embodiments of the present disclosure, the graphical interface including the execution area is displayed, and in response to the instruction inputted by the user, the first quantitative trading strategy is added to the execution area to form the first execution record, and the first quantitative trading strategy runs based on the first execution record to obtain the execution information of the first quantitative trading strategy. Therefore, the execution of the quantitative trading strategy can be realized through the graphical interface, with which the user can intuitively interact. Therefore, it is no longer require the user to have the capability of writing program codes, thereby improving the user experience.

In addition, after an automatic trading is performed with the method for executing the quantitative trading strategy provided by the embodiments of the present disclosure, the execution information of the quantitative trading strategy corresponding to the execution record, such as revenue summary, K-line trend chart, position, historical orders, execution logs and the like, can be displayed in the execution area, such that the user can analyze the effectiveness of the strategy, thereby further improving the user experience.

In some alternative embodiments, the strategy may be modified in the strategy canvas. Correspondingly, the execution records can be updated in real time according to the strategy update in the strategy canvas, which, for example, can be divided into the following two situations.

Situation 1, an execution strategy is modified.

In this case, the execution record is not affected, that is, the execution record related to the strategy is not affected by the modification of the user in the strategy canvas, and the parameters, which are set when the strategy is added to executing as well as when the strategy is executed, can be kept. Optionally, the user may be reminded in the canvas that the strategy is executed, and modification to the strategy has no influence on the executing. If an updated strategy is required to run, the strategy may be restarted after being stopped.

When the execution record of the modified strategy is started again after being stopped, an execution parameter setting interface can popup to allow the user to fill the parameters therein. Meanwhile, the parameter setting interface can remind that the strategy is modified and the parameters need to be set.

Situation 2, the stopped strategy is modified.

In this case, the execution record is affected, that is, the execution record can be updated to the latest strategy. For example, for restarting the execution record of the modified strategy after being stopped, an execution parameter setting interface may popup to allow the user to fill the parameters therein. Meanwhile, the parameter setting interface can remind that the strategy is modified and the parameters need to be set.

In some alternative embodiments, when a certain row in the execution list is selected, other modules in the execution area may then switch to the execution information of the strategy corresponding to the selected execution record.

In some alternative embodiments, operations such as editing, deleting, etc. are allowed to be performed in the execution list. For example, for a selected execution record, the edit or delete button may pop up by right-clicking on mouse. When the user selects the edit button, an execution parameter setting interface can popup to enable the user to modify the parameters. Alternatively, the right button may not pop up the edit button when the strategy is in the execution status. Additionally, it may be unallowable to modify the strategies and accounts in the execution parameter settings interface, for example, the button is changed to be disable.

The specific implementations of the present disclosure are described in detail with reference to the drawings. However, the present disclosure is not limited by the specific details of the above implementations. Within the scope of the technical concept of the present disclosure, various simple modifications can be made to the technical solutions of the present disclosure, and these simple modifications shall all fall within the protection scope of the present disclosure. For example, the various features described in the foregoing embodiments may be combined in any suitable manner without contradiction, and in order to avoid unnecessary repetition, various possible combinations are not described individually in the present disclosure. For example, various embodiments of the present disclosure may be arbitrarily combined with each other, as long as they are not contradictory to the concept of the present disclosure, and the same shall be considered as the disclosure of the present disclosure.

It should also be understood that, in the various method embodiments of the present disclosure, the serial numbers of the above-mentioned processes do not imply an order of execution, and the order of execution of the processes should be determined by their functions and inherent logic. Accordingly, the serial number should not constitute any limitations on the implementation processes of the embodiments of the present disclosure. It should be understood that the numerical designations are interchangeable under appropriate circumstances, such that the embodiments of the present disclosure may be implemented in an order other than those illustrated or described herein.

The apparatus embodiments of the present disclosure are described in detail below in combination with FIG. 10 to FIG. 11.

Figure 10:
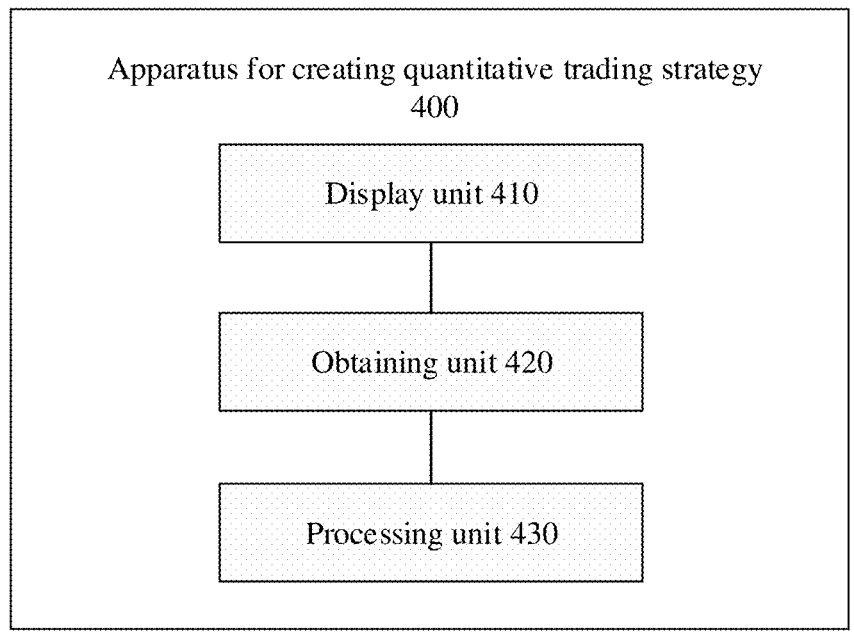
FIG. 10 is a schematic block diagram of an apparatus for executing a quantitative trading strategy according to an embodiment of the present disclosure.

FIG. 10 is a schematic block diagram of an apparatus 400 for executing a quantitative trading strategy according to an embodiment of the present disclosure. As illustrated in FIG. 10, the apparatus 400 may include a display unit 410, an obtaining unit 420, and a processing unit 430.

The display unit 410 is configured to display a graphical interface, and the graphical interface includes an execution area.

The obtaining unit 420 is configured to obtain a first instruction inputted by a user.

The processing unit 430 is configured to obtain a first quantitative trading strategy in response to the first instruction, the first quantitative trading strategy including at least one parameter related to a real market operation.

The processing unit 430 is further configured to add the first quantitative trading strategy to the execution area to form a first execution record corresponding to the first quantitative trading strategy.

The processing unit 430 is further configured to execute, based on the first execution record, the first quantitative trading strategy to obtain execution information of the first quantitative trading strategy.

Optionally, the processing unit 430 is specifically configured to: display, in response to the first instruction, a parameter setting interface for the first quantitative trading strategy; and obtain, through the parameter setting interface, a parameter related to the real market operation inputted by the user.

Optionally, the display unit 410 is further configured to display, through the parameter setting interface, a record description of the first quantitative trading strategy. When the first quantitative trading strategy is back-tested, the record description describes a back-test result of the first quantitative trading strategy; when the first quantitative trading strategy is not back-tested, the record description describes that the first quantitative trading strategy is not back-tested, and/or to recommend a back-test of the first quantitative trading strategy; and when the first quantitative trading strategy is back-tested and then updated, the record description describes the back-test result before the first quantitative trading strategy is updated, and recommends a back-test of the updated first quantitative trading strategy.

Optionally, the processing unit 430 is further configured to detect the at least one parameter related to the real market operation or a market-information privilege of a trading account of the user.

Optionally, the at least one parameter related to the real market operation includes at least one of a strategy name, a trading account, or a frequency parameter; and the frequency parameter includes an execution target and/or an execution frequency.

Optionally, the graphical interface further includes a navigation bar. The obtaining unit 420 is specifically configured to obtain the first instruction through a first entry of the first quantitative trading strategy in the navigation bar.

Optionally, the graphical display interface further includes a strategy canvas for establishing a quantitative trading strategy. The obtaining unit 420 is specifically configured to obtain the first instruction through a second entry of the first quantitative trading strategy in the strategy canvas.

Optionally, the obtaining unit 420 is specifically configured to obtain the first instruction through a third entry displayed in the execution area.

Optionally, the processing unit 430 is further configured to stop, based on the first execution record, executing the first quantitative trading strategy.

Optionally, the display unit 410 is further configured to display a trading password interface when the first quantitative trading strategy is added to the execution area for the first time, or when a validity period of the first quantitative trading strategy in the execution area expires, or when the first quantitative trading strategy is re-executed after the execution of the first quantitative trading strategy is stopped.

The obtaining unit 420 is further configured to obtain the trading password inputted by the user through the trading password interface.

Optionally, the execution information of the first quantitative trading strategy includes at least one of a position and order status, a revenue summary, an execution log, or a tendency chart of the first quantitative trading strategy.

It should be understood that apparatus embodiments and method embodiments may correspond to one another, and similar descriptions may refer to method embodiments, which is omitted herein to avoid repetition. Specifically, in this embodiment, the apparatus 400 may correspond to a corresponding body for implementing the method 200 according to the embodiments of the present disclosure, and the foregoing and other operations and/or functions of each module in the apparatus 400 are respectively for implementing the corresponding processes in the method illustrated in FIG. 2, which are not elaborated here for brevity.

The apparatus and system according to the embodiments of the present disclosure are described above in terms of functional blocks in conjunction with the following figures. It should be understood that the functional modules may be implemented by hardware, by instructions in software, or by a combination of hardware and software modules. Specifically, the steps of the method embodiments in the present disclosure may be implemented by integrated logic circuits of hardware in a processor and/or instructions in the form of software, and the steps of the method disclosed in the embodiments of the present disclosure may be directly implemented by a hardware decoding processor, or by a combination of hardware and software modules in the decoding processor. Optionally, the software modules may be located in a random-access memory, flash memory, read only memory, programmable read only memory, electrically erasable programmable memory, registers, or other storage medium known in the art. The storage medium is located in a memory, and a processor reads information in the memory and combines hardware thereof to complete steps of the above method embodiments.

Figure 11:
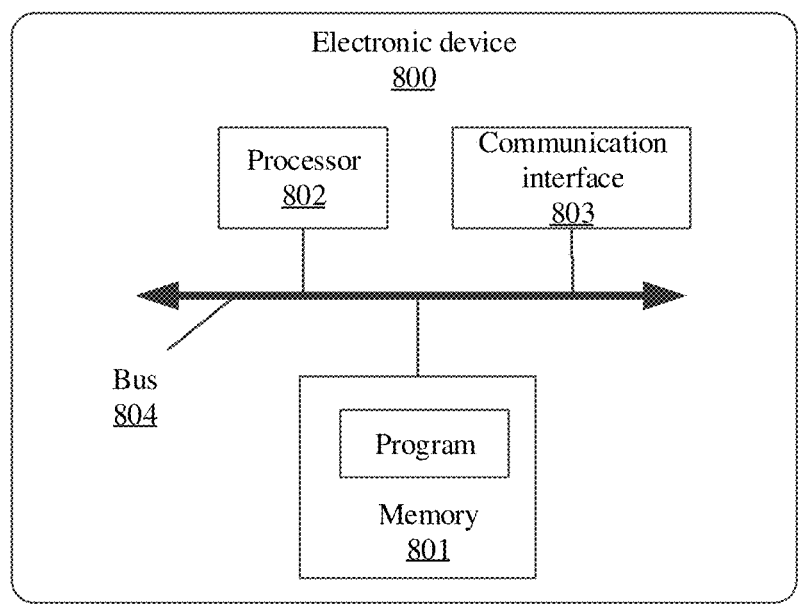
FIG. 11 is a schematic block diagram of an electronic device provided in an embodiment of the present disclosure.

FIG. 11 is a schematic block diagram of an electronic device 800 provided in an embodiment of the present disclosure.

As illustrated in FIG. 11, the electronic device 800 may include a memory 810 and a processor 820.

The memory 810 is configured to store a computer program and to transfer the program code to the processor 820. In other words, the processor 820 may call and execute the computer program from the memory 810 to implement the method according to the embodiments of the present disclosure.

For example, according to instructions in the computer program, the processor 820 may be configured to perform the steps of the method 200 described above.

In some embodiments of the present disclosure, the processor 820 may include, but is not limited to, general purpose processors, Digital Signal Processors (DSP), Application Specific Integrated Circuits (ASIC), Field Programmable Gate Arrays (FPGA) or other Programmable logic devices, discrete Gate or transistor logic devices, discrete hardware components, and the like.

In some embodiments of the present disclosure, the memory 810 includes, but not limited to, volatile memory and/or non-volatile memory. The non-volatile Memory may be a Read-Only Memory (ROM), a Programmable ROM (PROM), an Erasable PROM (EPROM), an Electrically Erasable PROM (EEPROM), or a flash Memory. The volatile Memory may be a Random Access Memory (RAM), which serves as an external cache. By way of example instead of limitation, there are many available forms of RAM, such as Static Random Access Memory (SRAM), Dynamic Random Access Memory (DRAM), Synchronous Dynamic Random Access Memory (SDRAM), Double Data Rate SDRAM (DDR SDRAM), Enhanced SDRAM (ESDRAM), synch link DRAM (SLDRAM), and Direct Rambus RAM (DR RAM).

In some embodiments of the present disclosure, the computer program can be divided into one or more modules, the one or more modules are stored in the memory 810 and executed by the processor 820 to perform the encoding methods provided herein. The one or more modules may be a series of computer program instruction segments capable of performing certain functions, the instruction segments being configured to describe the execution of the computer program in the electronic device 800.

Optionally, as illustrated in FIG. 11, the electronic device 800 may further include a transceiver 830. The transceiver 830 can be connected to the processor 820 or the memory 810.

The processor 820 may control the transceiver 830 to communicate with other devices. In particular, the processor 820 may control the transceiver 830 to transmit information or data to the other devices or control the transceiver 830 to receive information or data transmitted by the other devices. The transceiver 830 may include a transmitter and a receiver. The transceiver 830 may further include antennas, and the number of antennas may be one or more.

It should be understood that the various components within the electronic device 800 are connected by a bus system. The bus system includes, in addition to a data bus, a power bus, a control bus, and a status signal bus.

According to an aspect of the present disclosure, a communication device including a processor and a memory is provided, the memory is configured to store a computer program, the processor is configured to call and execute the computer program stored in the memory, allowing an encoder to perform the method according to the above-described method embodiments.

According to an aspect of the present disclosure, a computer storage medium having a computer program stored thereon is provided. The computer program, when being executed by a computer, enables the computer to perform the method according to the above-described method embodiments. Alternatively, the present disclosure also provides a computer program product including instructions, and the instructions, when being executed by a computer, cause the computer to execute the method according to the above method embodiments.

According to another aspect of the present disclosure, a computer program product or computer program is provided, and the computer program product or computer program includes computer instructions stored in a computer readable storage medium. A processor of a computer device reads the computer instructions from the computer-readable storage medium, and the processor executes the computer instructions, so that the computer device executes the method according to the above method embodiments.

In other words, when implemented in software, it may be implemented in whole or in part in the form of a computer program product. The computer program product includes one or more computer instructions. The processes or functions described according to the embodiments of the present disclosure are all or partially performed when the computer program instructions are loaded and executed on a computer. The computer may be a general-purpose computer, a special purpose computer, a network of computers, or other programmable devices. The computer instructions may be stored in a computer readable storage medium, or transmitted from one computer readable storage medium to another computer readable storage medium. For example, the computer instructions may be transmitted from one website, computer, server, or data center to another website, computer, server, or data center via wire (e.g., coaxial cable, fiber optic, Digital Subscriber Line (DSL)) or wireless (e.g., infrared, wireless, microwave, etc.). The computer-readable storage medium can be any available medium, which is accessible by a computer or a data storage device, such as a server, a data center including one or more available media. The available medium may be a magnetic medium (e.g., a floppy disk, a hard disk, a magnetic tape), an optical medium (e.g., a Digital Video Disc (DVD)), or a semiconductor medium (e.g., a Solid-State Disk (SSD)), and the like.

Those of ordinary skill in the art will appreciate that the various illustrative elements and algorithm steps described in connection with the embodiments disclosed herein may be implemented as electronic hardware, or combinations of computer software and electronic hardware. Whether such functionality is implemented as hardware or software depends upon the particular application and design constraints imposed on the technical solution. Skilled artisans may implement the described functionality in varying ways for each particular application, but such implementation decisions should not be interpreted as causing a departure from the scope of the present disclosure.

It can be understood by those skilled in the art that, for convenience and simplicity of description, the specific processes of the above-described systems, apparatuses and units may refer to the corresponding processes in the foregoing method embodiments, which are not repeatedly described herein.

In the several embodiments provided in the present disclosure, it should be understood that the disclosed system, apparatus and method may be implemented in other ways. For example, the above-described apparatus embodiments are merely illustrative. For example, the division of the units is only one type of logical functional division, and other divisions may be adopted in practice. For example, multiple units or components may be combined or integrated into another system, or some features may be omitted, or not executed. In addition, the illustrated or discussed mutual coupling or direct coupling or communication connection may be an indirect coupling or communication connection through some interfaces, devices or units, and may be in an electrical, mechanical or other form.

The units described as separate parts may or may not be physically separated, and parts displayed as units may or may not be physical units, may be located in one position, or may be distributed on multiple network units. Some or all of the units can be selected according to actual needs to achieve the purpose of the solution of the embodiment.

In addition, functional units in the embodiments of the present disclosure may be integrated into one processing unit, or each unit may exist alone physically, or two or more units are integrated into one unit.

The functions may be stored in a computer-readable storage medium if they are implemented in the form of software functional units and sold or used as separate products. Based on such understanding, the technical solutions of the present disclosure or portions thereof that substantially contribute to the prior art may be embodied in the form of a software product, which is stored in a storage medium and includes several instructions for causing a computer device (which may be a personal computer, a server, or a network device) to execute all or part of the steps of the methods described in the embodiments of the present disclosure. And the aforementioned storage medium includes: a U-disk, a removable hard disk, a Read-Only Memory (ROM), a Random Access Memory (RAM), a magnetic disk, an optical disk, or other various media capable of storing program codes.

The scope of the present disclosure is not limited to the specific embodiments of the present disclosure, as described above. Those skilled in the art can easily think of the changes or substitutions within the technical scope of the present disclosure, and shall be covered by the scope of the present disclosure. Therefore, the protection scope of the present disclosure shall be defined by the protection scope of the claims.

What is claimed is:

1. A method for executing a quantitative trading strategy based on a graphical interface, the method applied in an electronic device and comprising:
controlling, by a processor of the electronic device, a display of the electronic device to display a graphical interface, the graphical interface comprising an execution area, the graphical interface comprising a strategy canvas configured to establish a quantitative trading strategy, wherein the quantitative trading strategy is established by adding at least one graphical control comprising a start control, a condition control, and an event control to the strategy canvas, connecting the at least one graphical control with a connecting line, and editing attributes of the at least one graphical control;
obtaining, by the processor of the electronic device, a first instruction inputted by a user on the graphical interface;
obtaining, by the processor of the electronic device, a first quantitative trading strategy in response to the first instruction, wherein the first quantitative trading strategy comprises at least one parameter related to a real market operation, the at least one parameter related to a real market operation comprises an execution target and an execution frequency, and in response to detecting that the execution target has data push at the execution frequency, the processor of the electronic device triggers the first quantitative trading strategy to be executed once;
detecting, by the processor of the electronic device, the at least one parameter related to the real market operation, or detecting a market-information privilege of a trading account of the user, and alarming in response to detecting an abnormal condition, wherein the processor of the electronic device determines whether the at least one parameter is appropriate or not according to the following formula, and controls the display of the electronic device to display a corresponding alarm based on an abnormal condition of a parameter value of the at least one parameter, $$lev = \begin{cases} \text{par\_value} \in [\text{par\_min}, \text{par\_max}]; & 1 \\ \alpha \cdot \dfrac{\text{par\_min} - \text{par\_value}}{\text{par\_min}} > \eta; & 2 \\ \beta \cdot \dfrac{\text{par\_max} - \text{par\_value}}{\text{par\_max}} > \mu; & 3 \end{cases}$$

where lev represents an alarm level, and when it is equal to 1, it indicates a normal level, when it is equal to 2, it indicates a general alarm, and when it is equal to 3, it indicates a serious alarm, each alarm level corresponding to a different alarm presentation; par_value represents a parameter value actually filled by the user; par_min represents a minimum value in a preset parameter range; par_max represents a maximum value in the preset parameter range; α and β represent preset abnormal calculation factors; n and u represent preset abnormal threshold values and $\eta < \mu$;

adding, by the processor of the electronic device in response to detecting no abnormal condition, the first quantitative trading strategy to the execution area comprised in the graphical interface to form a first execution record corresponding to the first quantitative trading strategy in the execution area comprised in the graphical interface; and obtaining, by the processor of the electronic device, a second instruction inputted by the user through the first execution record in the execution area comprised in the graphical interface and executing, in response to the second instruction, the first quantitative trading strategy, to obtain execution information of the first quantitative trading strategy, wherein said obtaining, by the processor of the electronic device, the first quantitative trading strategy in response to the first instruction comprises:

controlling, by the processor of the electronic device in response to the first instruction, the display of the electronic device to switch the graphical interface to display a parameter setting interface for the first quantitative trading strategy; and obtaining, by the processor of the electronic device, the at least one parameter related to the real market operation inputted by the user through the parameter setting interface.

2. The method according to claim 1, further comprising:
displaying, through the parameter setting interface, a record description of the first quantitative trading strategy, wherein when the first quantitative trading strategy is back-tested, the record description describes a back-test result of the first quantitative trading strategy;

when the first quantitative trading strategy is not back-tested, the record description describes that the first quantitative trading strategy is not back-tested, and/or to recommend a back-test of the first quantitative trading strategy; or when the first quantitative trading strategy is back-tested and then updated, the record description describes the back-test result before the first quantitative trading strategy is updated, and recommends a back-test of the updated first quantitative trading strategy.

3. The method according to claim 1, wherein the at least one parameter related to the real market operation comprises at least one of a strategy name, a trading account, or a frequency parameter, wherein the frequency parameter comprises an execution target and/or an execution frequency.

4. The method according to claim 1, wherein the graphical interface further comprises a navigation bar, and wherein said obtaining, by the processor of the electronic device, the first instruction inputted by the user on the graphical interface comprises:

obtaining, by the processor of the electronic device, the first instruction through a first entry of the first quantitative trading strategy in the navigation bar.

5. The method according to claim 1, wherein the graphical display interface further comprises a strategy canvas for establishing a quantitative trading strategy, and wherein said obtaining, by the processor of the electronic device, the first instruction inputted by the user on the graphical interface comprises:

obtaining, by the processor of the electronic device, the first instruction through a second entry of the first quantitative trading strategy in the strategy canvas.

6. The method according to claim 1, wherein said obtaining, by the processor of the electronic device, the first instruction inputted by the user on the graphical interface comprises:

obtaining, by the processor of the electronic device, the first instruction through a third entry displayed in the execution area.

7. The method according to claim 1, further comprising:
stopping, based on the first execution record, execution of the first quantitative trading strategy.

8. The method according to claim 1, further comprising:
displaying a trading password interface when the first quantitative trading strategy is added to the execution area for the first time, or when a validity period of the first quantitative trading strategy in the execution area expires, or when the first quantitative trading strategy is re-executed after execution of the first quantitative trading strategy is stopped; and obtaining the trading password inputted by the user through the trading password interface.

9. The method according to claim 1, wherein the execution information of the first quantitative trading strategy comprises at least one of a position and order status, a revenue summary, an execution log, or a tendency chart of the first quantitative trading strategy.

10. An electronic device, comprising:
a processor; and
a memory having instructions stored thereon,
wherein the instructions, when executed by the processor, cause the processor to execute a method for executing a quantitative trading strategy, the method comprising:
displaying a graphical interface, the graphical interface comprising an execution area, the graphical interface comprising a strategy canvas configured to establish a quantitative trading strategy, wherein the quantitative trading strategy is established by adding at least one graphical control comprising a start control, a condition control, and an event control to the strategy canvas, connecting the at least one graphical control with a connecting line, and editing attributes of the at least one graphical control;

obtaining a first instruction inputted by a user on the graphical interface;

obtaining a first quantitative trading strategy in response to the first instruction, wherein the first quantitative trading strategy comprises at least one parameter related to a real market operation, the at least one parameter related to a real market operation comprises an execution target and an execution frequency, and in response to detecting that the execution target has data push at the execution frequency, the processor of the electronic device triggers the first quantitative trading strategy to be executed once;

detecting the at least one parameter related to the real market operation, or detecting a market-information privilege of a trading account of the user, and alarming in response to detecting an abnormal condition, wherein it is determined whether the at least one parameter is appropriate or not according to the following formula, and a corresponding alarm is displayed based on an abnormal condition of a parameter value of the at least one parameter, $$lev = \begin{cases} par\_value \in [par\_min, par\_max]; 1 \\ \alpha \cdot \dfrac{par\_min - par\_value}{par\_min} > \eta; 2 \\ \beta \cdot \dfrac{par\_max - par\_value}{par\_max} > \mu; 3 \end{cases}$$

where lev represents an alarm level, and when it is equal to 1, it indicates a normal level, when it is equal to 2, it indicates a general alarm, and when it is equal to 3, it indicates a serious alarm, each alarm level corresponding to a different alarm presentation; par_value represents a parameter value actually filled by the user; par_min represents a minimum value in a preset parameter range; par_max represents a maximum value in the preset parameter range; $\alpha$ and $\beta$ represent preset abnormal calculation factors; n and u represent preset abnormal threshold values and $\eta < \mu$;

adding, in response to detecting no abnormal condition, the first quantitative trading strategy to the execution area comprised in the graphical interface to form a first execution record corresponding to the first quantitative trading strategy in the execution area comprised in the graphical interface; and obtaining a second instruction inputted by the user through the first execution record in the execution area comprised in the graphical interface and executing, in response to the second instruction, the first quantitative trading strategy, to obtain execution information of the first quantitative trading strategy, wherein said obtaining the first quantitative trading strategy in response to the first instruction comprises:

switching, in response to the first instruction, the graphical interface to display a parameter setting interface for the first quantitative trading strategy; and obtaining the at least one parameter related to the real market operation inputted by the user through the parameter setting interface.

11. The electronic device according to claim 10, wherein the method further comprises:

displaying, through the parameter setting interface, a record description of the first quantitative trading strategy, wherein when the first quantitative trading strategy is back-tested, the record description describes a back-test result of the first quantitative trading strategy;

when the first quantitative trading strategy is not back-tested, the record description describes that the first quantitative trading strategy is not back-tested, and/or to recommend a back-test of the first quantitative trading strategy; or when the first quantitative trading strategy is back-tested and then updated, the record description describes the back-test result before the first quantitative trading strategy is updated, and recommends a back-test of the updated first quantitative trading strategy.

12. The electronic device according to claim 10, wherein the at least one parameter related to the real market operation comprises at least one of a strategy name, a trading account, or a frequency parameter, wherein the frequency parameter comprises an execution target and/or an execution frequency.

13. The electronic device according to claim 10, wherein the graphical interface further comprises a navigation bar, and wherein said obtaining the first instruction inputted by the user on the graphical interface comprises:

obtaining the first instruction through a first entry of the first quantitative trading strategy in the navigation bar.

14. The electronic device according to claim 10, wherein the graphical display interface further comprises a strategy canvas for establishing a quantitative trading strategy, and wherein said obtaining the first instruction inputted by the user on the graphical interface comprises:

obtaining the first instruction through a second entry of the first quantitative trading strategy in the strategy canvas.

15. The electronic device according to claim 10, wherein said obtaining the first instruction inputted by the user on the graphical interface comprises:

obtaining the first instruction through a third entry displayed in the execution area.

16. The electronic device according to claim 10, wherein the method further comprises:

stopping, based on the first execution record, execution of the first quantitative trading strategy.

17. The electronic device according to claim 10, wherein the method further comprises:

displaying a trading password interface when the first quantitative trading strategy is added to the execution area for the first time, or when a validity period of the first quantitative trading strategy in the execution area expires, or when the first quantitative trading strategy is re-executed after execution of the first quantitative trading strategy is stopped; and obtaining the trading password inputted by the user through the trading password interface.

18. The electronic device according to claim 10, wherein the execution information of the first quantitative trading strategy comprises at least one of a position and order status, a revenue summary, an execution log, or a tendency chart of the first quantitative trading strategy.

19. A computer-readable storage medium, having a computer program stored thereon, wherein the computer program causes a computer to perform the method according to claim 1.

20. A computer program product, comprising computer program codes, wherein the computer program codes, when executed by a communication device, cause the communication device to perform the method according to claim 1.

* * * * *